United States Patent
Kalze et al.

[11] Patent Number: 5,915,829
[45] Date of Patent: Jun. 29, 1999

[54] VEHICLE HEADLIGHT

[75] Inventors: Franz-Josef Kalze, Harsewinkel; Heinz Werner Rixen, Lippstadt, both of Germany

[73] Assignee: Hella KG Hueck & Co., Lippstadt, Germany

[21] Appl. No.: 08/883,351

[22] Filed: Jun. 26, 1997

[30] Foreign Application Priority Data

Jun. 28, 1996 [DE] Germany ............... 196 25 923

[51] Int. Cl.$^6$ ...................................... B60Q 1/08
[52] U.S. Cl. .................. 362/465; 362/280; 362/284; 362/513
[58] Field of Search .............. 362/276, 280, 362/282, 284, 455, 464–468, 512, 513

[56] References Cited

U.S. PATENT DOCUMENTS

| | | | |
|---|---|---|---|
| 1,315,168 | 9/1919 | Smith | 362/280 |
| 1,581,581 | 4/1926 | Lewis | 362/282 |
| 4,425,599 | 1/1984 | Rieder et al. | 362/280 |
| 5,138,540 | 8/1992 | Kobayashie et al. | 362/268 |

FOREIGN PATENT DOCUMENTS

| | | |
|---|---|---|
| 30 37 107 A1 | 4/1981 | Germany . |
| 36 01 388 A1 | 7/1987 | Germany . |
| 36 28 421 A1 | 2/1988 | Germany . |
| 37 29 515 | 1/1992 | Germany . |
| 43 06 316A1 | 9/1993 | Germany . |
| 43 35 286A1 | 4/1994 | Germany . |
| 44 35 446 A1 | 9/1995 | Germany . |
| 496749 | 3/1937 | United Kingdom . |

*Primary Examiner*—Alan Cariaso
*Attorney, Agent, or Firm*—Griffin, Butler Whisenhunt & Szipl, LLP

[57] ABSTRACT

Basic vertical and horizontal adjustment of a light beam (9) of a headlight are carried out with respect to a longitudinal axis (5) of the headlight by vertical (6) and horizontal (7) displacement of a lens (4) relative to a light source (2) and a reflector (1).

10 Claims, 2 Drawing Sheets

VEHICLE HEADLIGHT

BACKGROUND OF THE INVENTION

This invention relates to a vehicle headlight for projecting a light beam, comprising a reflector, a light source, a cover plate, and an ensuing, or serially-arranged, lens. The invention further relates to a process for adjusting a vehicle headlight for projecting a light beam involving a reflector, a light source, an opaque cover plate, and an ensuing lens.

German patent document (DE-37 29 515) discloses a vehicle headlight having a reflector with an optical axis extending in a horizontal direction, a first focal point and a second focal point that is further from the reflector than the first focal point. A light source is placed at the first focal point of the reflector, with the reflector being designed to reflect light rays from the light source so that they converge at the second focal point. A visor or opaque cover plate is placed near the second focal point of the reflector. A focusing lens is placed on a side of the cover plate directed away from the reflector, having a focal point in the vicinity of the second focal point of the reflector. The lens is designed so that it can be moved in a vertical direction between a low beam position and a high beam position.

When a headlight of this type is installed in a vehicle, accurate adjustment of the headlight is required, to prevent blinding of on-coming traffic, for example. In order to achieve a required basic adjustment of a projected light beam, the light beam must be capable of being moved along specific adjustment paths in vertical and horizontal directions. That is, a light beam distribution must be adjustable by adjusting the light beam's vertical and horizontal set angles with respect to a longitudinal axis of the headlight, or with respect to a longitudinal axis of the vehicle corresponding to the longitudinal axis of the headlight. Specifically, positions of individual system components of the headlight must be coordinated so that desired set angles of the light beam can be achieved in both low and high beam settings. This requires a high degree of accuracy and costly adjustment of individual system components of the headlight.

It is an object of this invention to provide an improved headlight of this type that is economical to produce and easy to adjust.

SUMMARY

According to principles of this invention, basic vertical and horizontal settings of a light beam can be carried out with respect to a longitudinal axis of a headlight by vertical and horizontal displacement of a lens.

Hence individual system components—with the exception of the lens—can be connected together in an uncomplicated manner during manufacture, so that alignment of the individual systems, e.g. for low beams and for high beams, is maintained. The reflector system for both low and high beam settings, for example, can be manufactured as a one-piece molded part. A reflector system can be built in a set position since separate adjustment capability is unnecessary.

BRIEF DESCRIPTION OF THE DRAWINGS

The invention is described and explained in more detail below using an embodiment shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
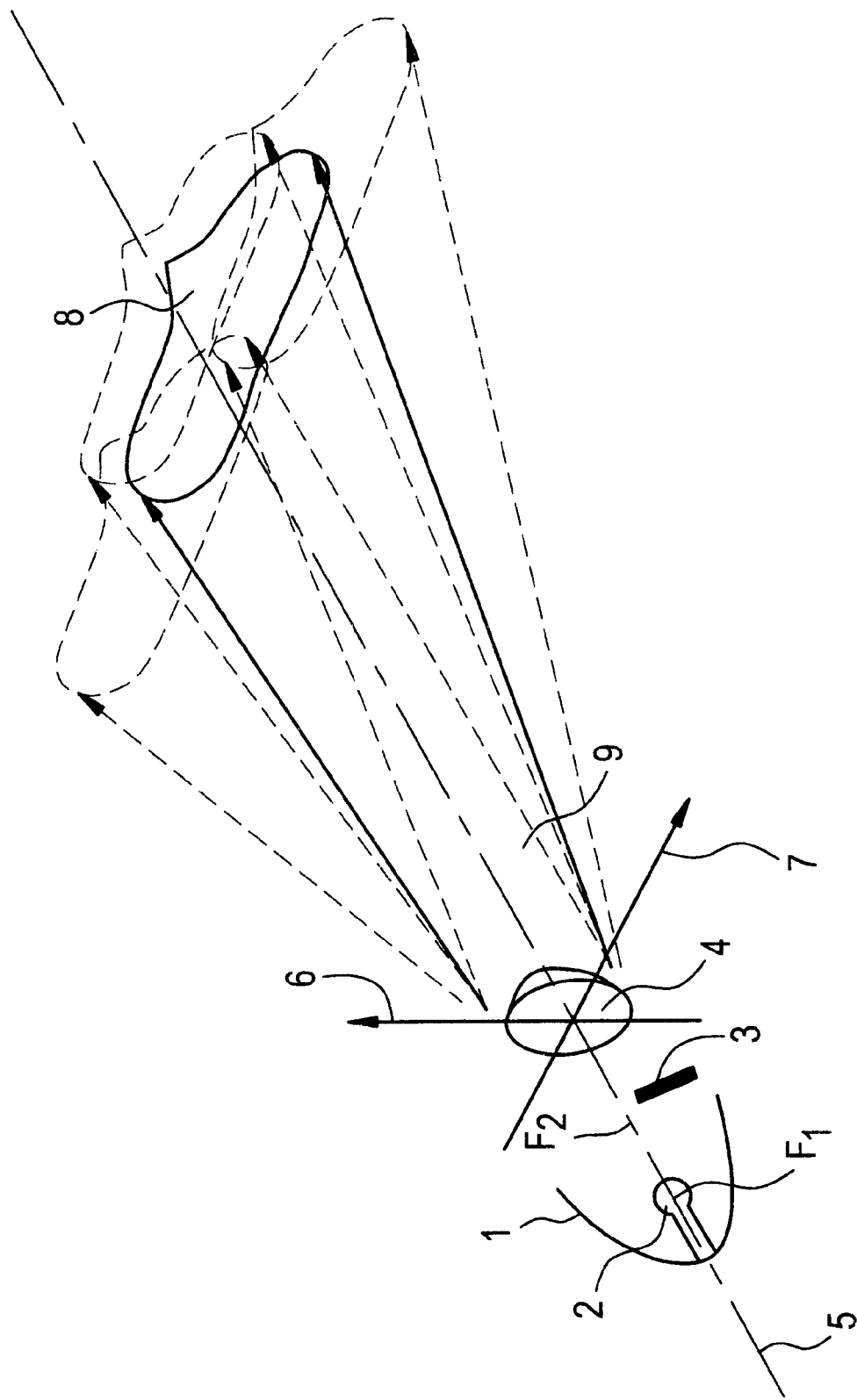
FIG. 1 shows an isometric schematic representation of headlight components with variously positioned light beam distributions.
Figure 2:
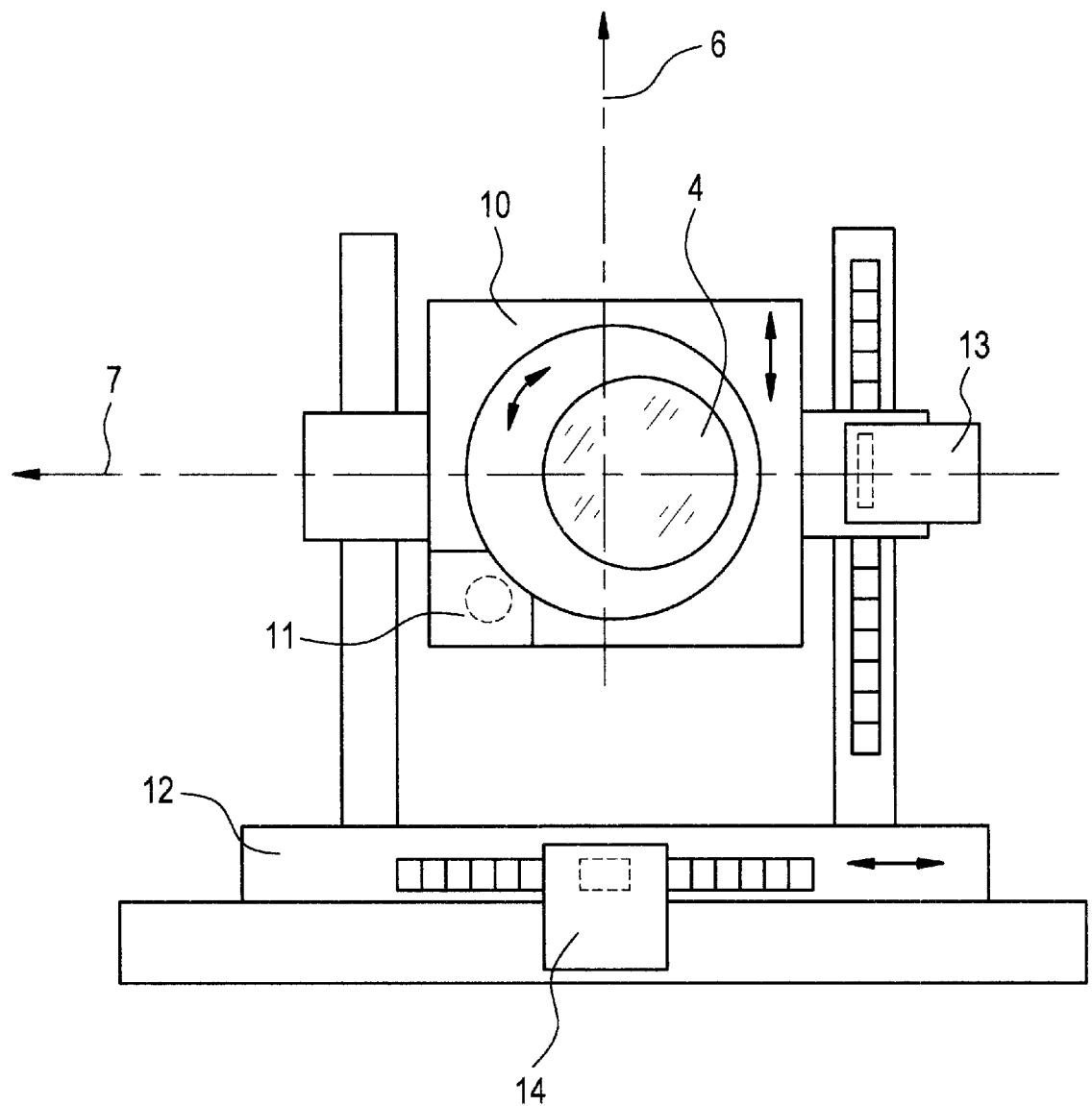
FIG. 2 shows schematically a front view of a first and second mountings supporting an eccentrically positioned lens.

A headlight comprises essentially a reflector 1, a light source 2, an opaque plate 3, and a lens 4. The light source 2 is placed in the vicinity of a first focal point $F_1$ of the reflector 1. The cover plate 3 is located near a second focal point $F_2$ of the reflector 1. A rear focal point of the lens 4, toward the reflector, 1 is located in the vicinity of the second focal point $F_2$ of the reflector 1. The lens 4 can be moved in a vertical direction 6 and a horizontal direction 7 in a plane that is perpendicular to a longitudinal headlight length axis 5. In combination with a headlight cover (not shown), an asymmetrical light distribution of a light bundle, or light beam, 9 is achieved.

When the lens 4, which is a standard lens having a focal length of approximately 40 mm, is moved, displacement of the lens by 1 mm produces displacement through a setting angle of approximately 1 degree. The lens 4 is positioned eccentrically in a first mounting 10. Thus, rotating the lens 4 in the first mounting 10, the lens is moved in vertical and horizontal directions 6, 7. If the eccentricity is 5 mm, for example, maximum displacements of the lens are achieved in the vertical direction 6 of 5 mm up and 5 mm down. A maximum excursion in the horizontal direction 7 is the same.

The lens 4 can be rotated in the first mounting 10 by use of a motorized operator 11. The first mounting 10 is mounted on a second mounting 12 such that it can be moved in a vertical direction thereon. The first mounting 10 can be moved in the vertical direction 6 by use of a motorized operator 13 coupled to the second mounting 12. The second mounting 12 is moved in a horizontal direction 7 by an additional motorized operator 14. The lens 4 is automatically moved in the horizontal direction 7 depending on a position of a steering wheel or positions of front wheels of the vehicle, by use of a control mechanism (not illustrated in the drawings) for the motorized operators. The lens 4 is also automatically controlled in the vertical direction 6 in dependence on an inclination of the vehicle in the direction of the longitudinal axis of the vehicle, by use of the control mechanism for the motorized operators. The control mechanism for the motorized operators also displaces the lens 4 in the vertical direction between the low and high beam settings.

According to a preferred embodiment of the invention, the lens is moved in the vertical direction depending on loading conditions of the vehicle or on an inclination of the vehicle laterally to the vehicle's longitudinal axis, thereby achieving regulation of a beam height level.

According to a further preferred embodiment, the lens can be automatically moved in a horizontal direction depending on the position of the steering wheel of the vehicle, or the position of its front wheels, so that cornering control of the light beam is achieved in a simple manner.

In addition, according to a preferred embodiment, switching between low beam and high beam settings is handled by vertical displacement of the lens from the low beam setting into the high beam setting.

According to the preferred embodiment, the lens is placed eccentrically with respect to the longitudinal axis of the headlight so that it can rotate eccentrically about the longitudinal axis of the headlight. By rotating the lens, a defined displacement in horizontal and vertical directions is achieved. Rotation can be done manually with adjusting screws, or by use of a motorized operator. A first mounting is connected to a second mounting and can be moved in a vertical and a horizontal direction by motorized operators. Thus additional dynamic displacements in the horizontal and vertical directions can override basic settings or adjustments in the horizontal and vertical directions.

This invention provides an improved process for adjusting headlights with ensuing lenses and allows such universal adjustments that special adjustments of various system components of the headlight are unnecessary.

According to this invention, after a headlight is installed in a vehicle, set angles of light beam distribution are adjusted by displacing the lens in vertical and horizontal directions.

An advantage of such a process is that even if fixed system components are used in a headlight, which have been manufactured as one-piece molded parts, for example, an alignment of the individual system remains possible. An adjustment of the light beam arrangement can be carried out manually by use of adjusting screws.

According to one preferred embodiment, the lens is displaced in vertical and horizontal directions by use of motorized operators. By using motorized operators, programmed automatic displacement of the lens, and thus programmed control of the light beam, is possible.

While the invention has been particularly shown and described with reference to a preferred embodiment, it will be understood by those skilled in the art that various changes in form and detail may be made therein without departing from the spirit and scope of the invention.

The invention claimed is:

1. A headlight, particularly for vehicles, for projecting a light beam in a substantially horizontal direction, comprising a light source, a reflector positioned behind the light source for reflecting light from the light source in the light beam, a cover plate located in the light beam, and an ensuing lens, wherein the headlight further includes a displacement means for vertically and horizontally displacing the lens relative to the reflector and light source for adjusting a vertical and horizontal basic direction of the light beam with respect to a longitudinal axis of the headlight.

2. A headlight as in claim 1, wherein the displacement means includes a means for positioning the lens eccentrically with respect to the longitudinal axis of the headlight so that the lens can be eccentrically rotated substantially about the longitudinal axis of the headlight.

3. A headlight as in claim 1, wherein the displacement means is for automatically displacing the lens in vertical directions between low and high beam settings.

4. A headlight as in claim 1, wherein the displacement means includes motorized operators for moving the lens.

5. A headlight as in claim 1, wherein the displacement means includes a first mounting for holding the lens to be moved in vertical and horizontal directions transversely to the longitudinal axis of the headlight.

6. A headlight as in claim 5, wherein the first mounting is coupled to a second mounting to be moved thereon in vertical directions transversely to the longitudinal axis of a headlight.

7. A headlight as in claim 6, wherein is further included a means for moving the first mounting and the second mounting transversely to the longitudinal axis of a headlight in a horizontal direction.

8. A headlight as in claim 7, wherein is further included at least one motorized operator for moving the first mounting relative to the second mounting.

9. A process for adjusting a vehicle headlight for projecting a light beam in a substantially horizontal direction, said vehicle headlight comprising a light source, a reflector positioned behind the light source for reflecting light from the light source in the light beam, a cover plate located in the light beam, and an ensuing lens, wherein after the headlight is installed in a vehicle, angles of the light beam are set by moving the lens in vertical and horizontal directions.

10. A process as in claim 9, wherein the lens is moved in the vertical direction by a motorized operator to alternate between high beam and low beam settings.

* * * * *